(12) United States Patent
Lee

(10) Patent No.: US 9,374,629 B2
(45) Date of Patent: Jun. 21, 2016

(54) METHODS AND APPARATUS TO CLASSIFY AUDIO

(71) Applicant: The Nielsen Company (US), LLC, Schaumburg, IL (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 13/841,920

(22) Filed: Mar. 15, 2013

(65) Prior Publication Data

US 2014/0282664 A1 Sep. 18, 2014

(51) Int. Cl.
| | |
|---|---|
| *H04N 7/14* | (2006.01) |
| *H04N 21/8358* | (2011.01) |
| *H04N 21/258* | (2011.01) |
| *H04N 21/422* | (2011.01) |
| *H04N 21/439* | (2011.01) |
| *H04N 21/442* | (2011.01) |
| *H04H 60/58* | (2008.01) |
| *G10L 25/81* | (2013.01) |
| *G10L 25/78* | (2013.01) |
| *H04H 60/47* | (2008.01) |

(52) U.S. Cl.
CPC ............ *H04N 21/8358* (2013.01); *G10L 25/78* (2013.01); *G10L 25/81* (2013.01); *H04H 60/58* (2013.01); *H04N 21/25891* (2013.01); *H04N 21/42203* (2013.01); *H04N 21/4394* (2013.01); *H04N 21/44222* (2013.01); *H04H 60/47* (2013.01)

(58) Field of Classification Search
CPC ..................................................... G10L 25/87
See application file for complete search history.

(56) References Cited

U.S. PATENT DOCUMENTS

| | | | |
|---|---|---|---|
| 4,829,578 A | 5/1989 | Roberts | |
| 5,298,674 A | 3/1994 | Yun | |
| 5,687,241 A | 11/1997 | Ludvigsen | |
| 5,983,176 A | 11/1999 | Hoffert et al. | |
| 6,139,505 A * | 10/2000 | Murphy | ................. 600/532 |
| 6,185,527 B1 | 2/2001 | Petkovic et al. | |
| 6,684,194 B1 | 1/2004 | Eldering et al. | |
| 6,801,261 B1 | 10/2004 | Haynes | |
| 7,486,925 B2 | 2/2009 | Breen | |
| 8,108,888 B2 | 1/2012 | Ramaswamy | |
| 8,635,065 B2 | 1/2014 | Goronzy-Thomae et al. | |
| 2010/0027820 A1 | 2/2010 | Kates | |
| 2010/0269127 A1 | 10/2010 | Krug | |
| 2011/0223997 A1 | 9/2011 | Mao | |

(Continued)

OTHER PUBLICATIONS

Zhu Liu et al., "Audio Feature Extraction & Analysis for Scene Classification," 7 pages.

(Continued)

*Primary Examiner* — Jefferey Harold
*Assistant Examiner* — Samira Monshi
(74) *Attorney, Agent, or Firm* — Hanley Flight & Zimmerman, LLC

(57) ABSTRACT

Methods, apparatus, systems and articles of manufacture are disclosed herein to classify audio. An example method includes determining a first count of volume events having a first period of time associated with the audio. The example method also includes determining a second count of volume events having a second period of time associated with the audio. The example method also includes classifying the audio based on the first count and the second count.

21 Claims, 6 Drawing Sheets

(56) References Cited

U.S. PATENT DOCUMENTS

2013/0070929 A1* 3/2013 Adachi et al. .................. 381/56
2013/0077797 A1* 3/2013 Hoy et al. ...................... 381/56

OTHER PUBLICATIONS

Courtenay Cotton, "A Three-Feature Speech/Music Classification System," Dec. 14, 2006, 19 pages.

Kirill Sakhnov, "Approach for Energy-Based Voice Detector with Adaptive Scaling Factor," IAENG International Journal of Computer Science, 36:4, IJCS_36_4_16, Nov. 19, 2009, 6 pages.

John Saunders, "Real-Time Discrimination of Broadcast Speech/Music," IEEE, 1996, 4 pages.

Eric Scheirer et al., "Construction and Evaluation of a Robust Multifeature Speech/Music Discriminator," Proceedings of the 1997 International Conference on Acoustics, Speech, and Signal Processing (ICASSP), Munich, Germany, Apr. 21-24, 1997, IEEE, 10 pages.

Michael Jerome Hawley, "Structure out of Sound," Massachusetts Institute of Technology, Sep. 1993, 185 pages.

* cited by examiner

METHODS AND APPARATUS TO CLASSIFY AUDIO

FIELD OF THE DISCLOSURE

This disclosure relates generally to audience measurement, and, more particularly, to methods and apparatus to classify audio.

BACKGROUND

Identifying media (e.g., television (TV) programs, radio programs, advertisements, commentary, audio, video, movies, commercials, advertisements, etc.) is useful for assessing audience exposure to such media. For example, in audience metering applications, a code or watermark may be inserted or embedded in the audio or video of media, wherein the code/watermark is later detected at one or more monitoring sites when the media is presented (e.g., played at monitored households). The information payload of the code/watermark embedded into an original signal can include unique program identification information, source identification information, broadcaster information, and/or time of broadcast information. Additionally or alternatively, a signature, fingerprint, etc. representative of some characteristic of a signal carrying and/or representing one or more aspects of the signal (e.g., a frequency spectrum of an audio signal) can be collected at the one or more monitoring sites. Collected signature(s) can be compared against a collection of reference signatures of known media to identify the tuned media. Monitoring sites may be locations such as, households, stores, places of business and/or any other public and/or private facilities where exposure to, and/or consumption of, media is monitored. For example, at a monitoring site, codes/watermarks and/or signatures/fingerprints from the audio and/or video are captured. The collected codes/watermarks and/or signatures/fingerprints are sent to a central data collection facility for analyses such as the computation of media exposure statistics.

DETAILED DESCRIPTION

Figure 1:
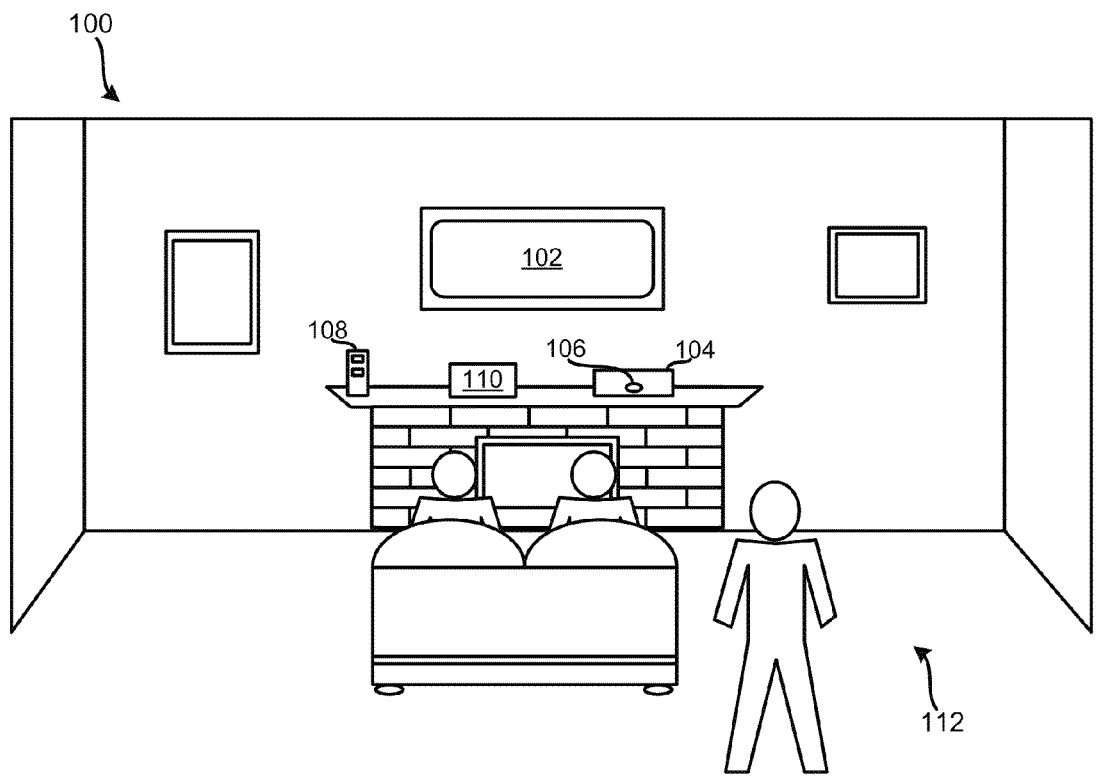
FIG. 1 is a diagram of an example system constructed in accordance with the teachings of this disclosure to classify audio using temporal features.

FIG. 1 is an illustration of an example media exposure environment 100 including a media presentation device 102 and an example audience measurement device 104 for measuring and/or identifying an audience 112 of the media presentation device 102. In the illustrated example of FIG. 1, the media exposure environment 100 is a room of a household (e.g., a "Nielsen family") that has been statistically selected for monitoring for the purpose of developing television ratings data for a population/demographic of interest. One or more persons of the household may have registered with the system (e.g., by agreeing to be a panelist) and may have provided demographic information as part of the registration. The example audience measurement device 104 can be implemented in additional and/or alternative types of environments such as, for example, a room in a non-statistically selected household, a theater, a restaurant, a tavern, a store, an arena, etc. For example, the environment may not be associated with a panelist of an audience measurement study, but instead may simply be an environment associated with a purchase of a media presentation device such as an XBOX®. In the illustrated example of FIG. 1, the media presentation device 102 is a television (referred to as television 102 herein) coupled to a video game console (e.g., an XBOX®) 108 and a set-top box (STB) 110 that implements a digital video recorder (DVR) and a digital versatile disc (DVD) player. The example audience measurement device 104 can be implemented in connection with additional and/or alternative types of media presentation devices such as, for example, a radio, a computer monitor, an over-the-top device, and/or any other communication device able to present media to one or more individuals via any past, present or future devices (e.g., broadcast television, analog television, digital television, satellite broadcast, Internet, cable, etc.).

The example audience measurement device 104 of FIG. 1 utilizes a sensor 106 (e.g., a microphone) to capture audio data from the environment 100. For example, the sensor 106 may capture audio originating from any of the television 102, the video game console 108, and the set-top box 110. For example, audio from the video game console 108 and/or the set-top box 110 may be output via the television 102. Additionally or alternatively, audio from the television 102, the video game console 108, and/or the set-top box 110 may be output by another device (e.g., a home theatre system).

As described in detail below in connection with FIG. 2, the example audience measurement device 104 of FIG. 1 also monitors the environment 100 to identify media being presented (e.g., displayed, played, etc.) by the television 102 and/or other media presentation devices to which the audience 112 is exposed. For example, the television 102 may present television programs originating from the STB 110 and/or a video game originating from the video game console 108. In some examples, identification(s) of media to which the audience 112 is exposed are correlated with behavior data (e.g., engagement levels) collected by the sensor 106 to additionally or alternatively generate engagement ratings for the media.

Figure 2:
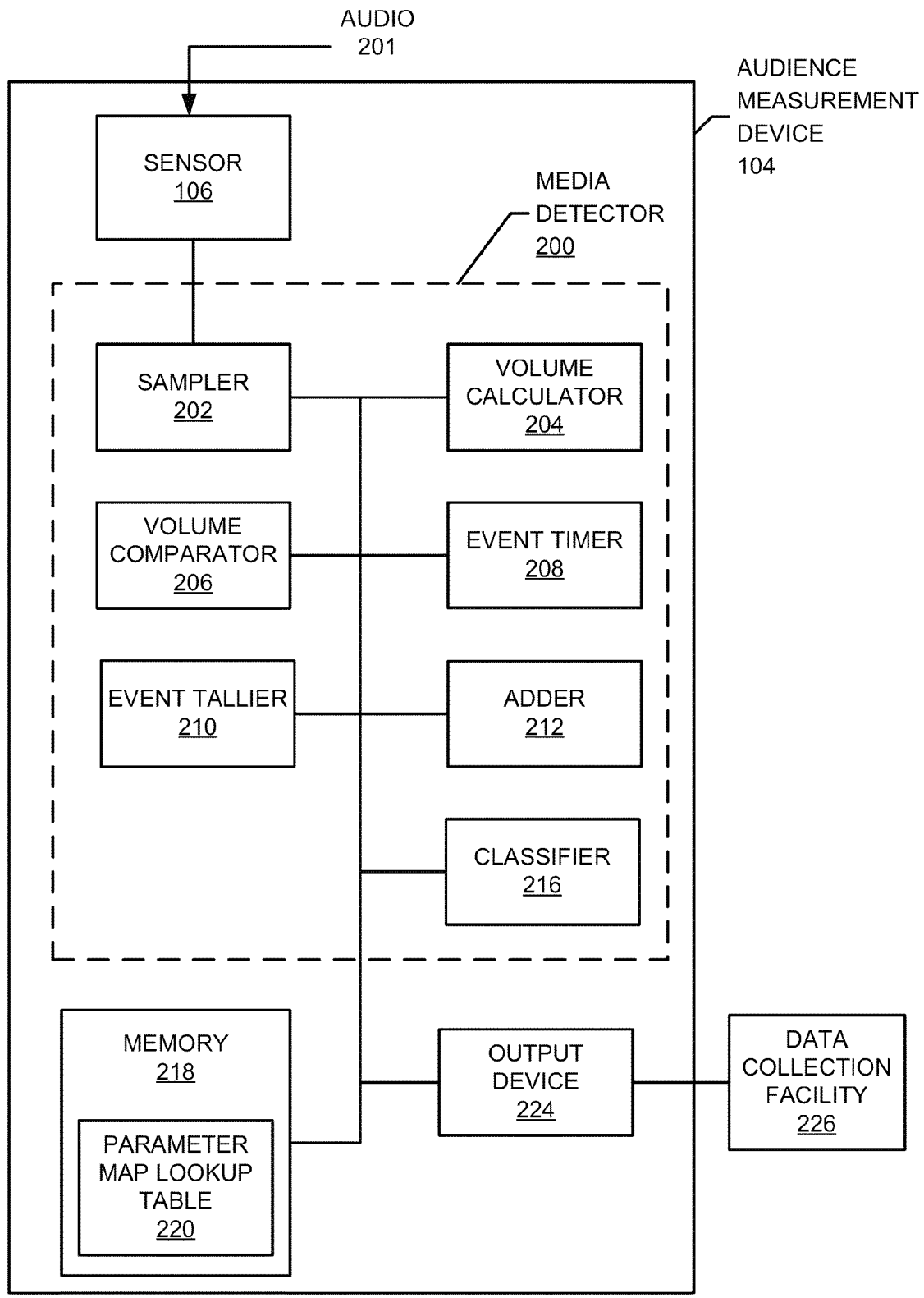
FIG. 2 is a block diagram of the example audience measurement device of FIG. 1.

FIG. 2 is a block diagram of an example implementation of the audience measurement device 104 of FIG. 1. The example audience measurement device 104 of FIG. 2 includes the sensor 106 of FIG. 1 and a media detector 200. The example media detector 200 includes a sampler 202, a volume calculator 204, a volume comparator 206, an event timer 208, an event tallier 210, an adder 212 and a classifier 216. The example sensor 106 of FIG. 2 captures audio 201 of the environment 100 in which the audience 112 is exposed to media output by the media presentation device 102 of FIG. 1. In the illustrated example, the example sensor 106 of FIG. 2 includes a microphone (e.g., one microphone) to collect audio 201 in the environment 100. In some examples, the sensor 106 may include more than one microphone, for example, the sensor 106 may be a directional microphone array capable of detecting audio in selectable areas or directions in the media exposure environment 100. As used herein, audio is any type of signal having a frequency falling within the normal human audibility spectrum. For example, audio may be speech, music, an audio portion of an audio and/or video program (e.g., a television (TV) program, a video game, a movie, an Internet video, a radio program, a commercial spot, etc.), noise or any other sound.

In the illustrated example of FIG. 2, the media detector 200 includes the sampler 202 to sample the audio 201 received by the sensor 106 at a sampling frequency to form a sampled audio signal. In some examples in which the audio 201 is provided to the media detector 200 in analog form (e.g., from the sensor 106), the example sampler 202 is implemented using an analog-to-digital converter or any other suitable digitizer. Alternatively, an analog-to-digital converter may not be required if the sensor 106 provides the audio 201 in digital form.

In the illustrated example of FIG. 2, the sampler 202 samples audio 201 at 800 times per second over twenty seconds (e.g., an audio segment). While sampling at a higher sampling frequency may provide better fidelity, sampling at lower sampling frequencies may be advantageous to reduce the computational load on the audience measurement device 104. Each sample from the sampler 202 may be represented by a string of bits, wherein the number of bits represents the precision with which the audio 201 is sampled. For example, the sampler 202 may produce 8-bit, 16-bit, 24-bit or 32-bit values.

In addition to sampling the audio 201, the example sampler 202 of FIG. 2 accumulates a number of samples (e.g., an audio block) that are to be processed together. For example, the example sampler 202 may accumulate a 16 sample audio block that is passed to the example volume calculator 204. Alternatively, the volume calculator 204 may include an accumulator in which the audio block is accumulated in a buffer before it is processed. In the illustrated example, the sampler 202 indicates to the adder 212 when the end of an audio segment (e.g., 20 second block of audio) is reached.

In the illustrated example of FIG. 2, the media detector 200 includes a volume calculator 204 to calculate a volume value for the audio block received from the sampler 202 and to send the volume value to the volume comparator 206. For example, the volume calculator 204 receives and/or accumulates the samples (e.g., 16 samples) and sums the absolute value of the audio samples of the audio block to determine a volume value for the audio block. In some examples, the volume calculator 204 may compare the volume value to a volume threshold (e.g., a minimum threshold that must be met to qualify the volume value for analysis). For example, if the volume value of the current audio block is less than a volume threshold (e.g., does not meet the volume threshold), comparing the volume value to volume values for other blocks may result in skewed and/or incorrect measurements. Thus, when the volume value of the current audio block meets the volume threshold, the volume calculator 204 triggers additional analysis of the audio block. For example, the volume calculator 204 of the illustrated example sends the volume value of the current audio block to the volume comparator 206 to determine whether a volume event occurred. As used herein, a volume event may be any notable characteristic of the volume of an audio block (e.g., a volume jump from a previous audio block (e.g., increase, rapid increase, etc.), a volume drop from a previous audio block (e.g., decrease, rapid decrease, etc.), or any other notable volume characteristic. In contrast, when the volume value of the current audio block does not meet the volume threshold, the example volume calculator 204 may not trigger a volume event for further analysis of the current audio block. For example, the volume comparator 206 may ignore and/or discard the volume value.

In the illustrated example of FIG. 2, the example volume comparator 206 receives the volume value of the current audio block from the volume calculator 204 and compares it to a volume value of a previous audio block. For example, the volume comparator 206 may store a portion of previously processed audio block volume values in a buffer before they are compared to a current audio block volume value. In the illustrated example of FIG. 2, when a ratio of the current audio block volume value and the previous audio block volume value meets a volume event threshold (e.g., a threshold of two times the previous audio block volume value, a threshold of half the previous audio block volume value, etc.), the volume comparator 206 indicates that a volume event has occurred.

In the illustrated example of FIG. 2, the media detector 200 includes the event timer 208 to measure the time between two sequential volume events. For example, the event timer 208 may count the number of audio blocks processed and/or the amount of time that has passed since the last volume event was detected. In some examples, the event timer 208 starts a timer each time a volume event detection is indicated by, for example, the volume comparator 206. In the illustrated example, the event timer 208 sends the number of blocks and/or the measured time to the event tallier 210.

In the illustrated example of FIG. 2, the event tallier 210 maintains a count for each of the measured time values provided by the event timer 208. The example event tallier 210 may maintain the count using any number of techniques. For example, the event tallier 210 may designate a counter for each received measured time (e.g., a counter for each of 0.02 seconds, 0.04 seconds, 0.06 seconds, etc.). In some such examples, when the event tallier 210 receives a measured time, the event tallier 210 increments the corresponding counter. In some other examples, the event tallier 210 maintains a histogram for the counts. In some examples, the event tallier 210 may list the measured times in, for example, any type of data structure in which the entries can be made available to the media detector 200.

In response to receiving an indication of the end of the audio segment (e.g., via the sampler 202), the example adder 212 of the illustrated example of FIG. 2 generates parameters using the information stored in the event tallier 210. In the illustrated example of FIG. 2, the adder 212 determines a first parameter as the total number of tallies corresponding to a first period of time (e.g., volume events having the first period of time) between successive volume event occurrences (e.g., 20 milliseconds). In the illustrated example, the adder 212 determines the second parameter by summing a number of detected volume event occurrences corresponding to a second period of time (e.g., detected volume events having the second period of time such as volume events having a period of time less than 320 milliseconds) as recorded by the event tallier 210.

Video game audio has different characteristics than television program audio. For example, television program audio consists primarily of speech and tends not to include a musical score while characters in the television program are speaking. Furthermore, a characteristic component of speech is the pronunciation of syllables. Peaks in volume of speech coincide with the start of the pronunciation of the syllables. In contrast, sounds in video games such as explosions, gunfire, and so forth, generally have peaks in volume at random intervals. In addition, video game audio typically includes a musical score playing in the background of the game play. As a result, the number of volume events in video games is reduced. Accordingly, an indication of speech audio may be used to differentiate between a television program and a video game or any other audio that includes music and/or speech combined with music. That is, discerning between television program audio and video game audio may be simplified by identifying the audio as speech or not speech. Thus, because the number of syllables per second in speech occurs within a relatively narrow range of time, identifying the times between volume events (e.g., jumps) can be indicative of speech audio (as opposed to musical audio, video game audio (e.g., a combination of speech and musical audio), or other non-speech audio). Thus, in the illustrated example, the first period of time utilized by the adder 212 has been selected as 20 milliseconds to represent the lower limit of the narrow range of time between detected volume events in speech. The second period of time utilized by the adder 212 has been selected as 320 milliseconds to represent an upper limit of the narrow range of time between detected volume events in speech. Other values for the first period of time and/or the second period of time may alternatively be selected.

The classifier 216 of the illustrated example utilizes the first parameter and the second parameter, made available by the adder 212, to classify the audio as television program audio or video game audio. In the illustrated example, the classifier 216 maps the first parameter and the second parameter pairing to a classification. For example, the classifier 216 may query the lookup table (e.g., an example parameter map lookup table 220) for an audio classification based on the first parameter and second parameter pairing.

In the illustrated example of FIG. 2, the parameter map lookup table 220 stores parameter and classification pairings. For example, the parameter map lookup table 220 may include an n-dimensional lookup table (where n is the number of parameters included in the analysis). In the illustrated example, the parameter map lookup table 220 uses a two-dimensional lookup table. In some such examples, the parameter map lookup table 220 returns a classification to the classifier 216 corresponding to matching values in the parameter map lookup table 220 (e.g., a matching record). However, in some examples, a parameter pairing may not map to a classification. That is, the combination of values for the first parameter and the second parameter may be undefined or unknown. Thus, in some examples, the data stored in the parameter map lookup table 220 may be grouped into bins (or ranges) indicative of a television program or a video game. In some examples, the bin size may be uniformly distributed, logarithmically scaled, adaptive, etc. For example, a logarithmic scale may be used so that larger bins (e.g., bins encompassing more time values) are used for larger time values (e.g., larger times between detected volume events) to decrease the chance of a point corresponding to a combination of parameter values being unclassified. Although the parameter map lookup table 220 is described in reference to a two-dimensional lookup table, other techniques for mapping the first parameter and the second parameter to a classification are also possible. For example, the parameter map lookup table 220 may be an n-dimensional lookup table, a nearest neighbor algorithm, a list of classified n-dimensional parameter ranges, etc.

In some examples, the parameter map lookup table 220 is pre-populated with classifications. For example, an audience measurement entity may periodically and/or aperiodically upload updated parameter pairing classifications. Additionally and/or alternatively, in some examples, the parameter map lookup table 220 learns parameter pairing classifications over time. For example, in addition to the first parameter and the second parameter, the parameter map lookup table 220 may also receive an indication whether the parameter pair corresponds to a television program or a video game (e.g., an indication via the classifier 216). In some such examples, a tally for the corresponding audio is recorded for corresponding parameter pairs. Thus, after several iterations of receiving an audio classification and a corresponding parameter pair, each parameter pair, bin, range, etc. included in the parameter map lookup table 220 corresponds to a television program to video game ratio (e.g., a ratio of the number of times that a parameter pair, bin, range, etc. was television audio to a number of times that the parameter pair, bin, range, etc. was video game audio in a training set of data). In some examples, the parameter map lookup table 220 "learns" the likelihood (or probability) that a first parameter pair, bin, range, etc. is a television program or a video game based on the ratio. In some examples, the audio classification may include confidence analysis. For example, the parameter map lookup table 220 may classify a bin having ten total tallies and a three-to-two ratio of television program tallies to video game tallies as a television program with less confidence than a bin having one hundred total tallies, but also with a three-to-two ratio of television program tallies to video game tallies.

Using the learned parameter pair classifications, the parameter map lookup table 220 may return a classification to the classifier 216 when queried (e.g., while testing the meter 104). In some examples, iterations may result in one or more tallies for both television programs and for video games for the same parameter pair. In some such examples, the parameter map lookup table 220 may calculate a likelihood of the parameter pair corresponding to, for example, a television program. For example, a certain parameter pair may have three tallies representative of a television program and one tally representative of a video game. In some such examples, the parameter map lookup table 220 returns to the classifier 216 a television program classification. Other techniques for "teaching" the parameter map lookup table 220 parameter pair classifications are also possible, such as, for example, a neural network classifier, etc.

In the illustrated example of FIG. 2, the audience measurement device 104 also includes a memory 218 and an output device 224. In the illustrated example, the memory 218 includes the parameter map lookup table 220. In some examples, the memory 218 records the classifications that the classifier 216 determines. The memory 218 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 218 may include one or more double data rate (DDR) memories, such as DDR, DDR2, DDR3, mobile DDR (mDDR), etc. The memory 218 may also include one or more mass storage devices such as, for example, hard drive disk(s), compact disk drive(s), digital versatile disk drive(s), etc.

In the illustrated example of FIG. 2, the output device 224 periodically and/or aperiodically exports the recorded data from the memory 218 to a data collection facility 226 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In the illustrated example of FIG. 2, the data collection facility 226 is managed by an audience measurement entity. In some examples, some or all of the data analysis (e.g., classifying the audio as a television program or a video game) is performed at the data collection facility 226. In some such examples, the audience measurement device 104 could export audio and/or partially processed audio information to the data collection facility 226 for further processing. Although only one environment 100 is shown in FIG. 1, the data collection facility 226 may compile data from many monitored exposure environments (e.g., multiple monitored locations).

While an example manner of implementing the audience measurement device 104 of FIG. 1 is illustrated in FIG. 2, one or more of the elements, processes and/or devices illustrated in FIG. 2 may be combined, divided, re-arranged, omitted, eliminated and/or implemented in any other way. Further, the example media detector 200, the example sampler 202, the example volume calculator 204, the example volume comparator 206, the example event timer 208, the example event tallier 210, the example adder 212, the example classifier 216 and/or more, more generally, the example audience measurement device 104 of FIG. 2 may be implemented by hardware, software, firmware and/or any combination of hardware, software and/or firmware. Thus, for example, any of the example media detector 200, the example sampler 202, the example volume calculator 204, the example volume comparator 206, the example event timer 208, the example event tallier 210, the example adder 212, the example classifier 216 and/or more, more generally, the example audience measurement device 104 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media detector 200, the example sampler 202, the example volume calculator 204, the example volume comparator 206, the example event timer 208, the example event tallier 210, the example adder 212, the example classifier 216 and/or more, more generally, the example audience measurement device 104 of FIG. 2s/are hereby expressly defined to include a tangible computer readable storage device or storage disk such as a memory, a digital versatile disk (DVD), a compact disk (CD), a Blu-ray disk, etc. storing the software and/or firmware. Further still, the example audience measurement device 104 of FIG. 1 may include one or more elements, processes and/or devices in addition to, or instead of, those illustrated in FIG. 2, and/or may include more than one of any or all of the illustrated elements, processes and devices.

Figure 3:
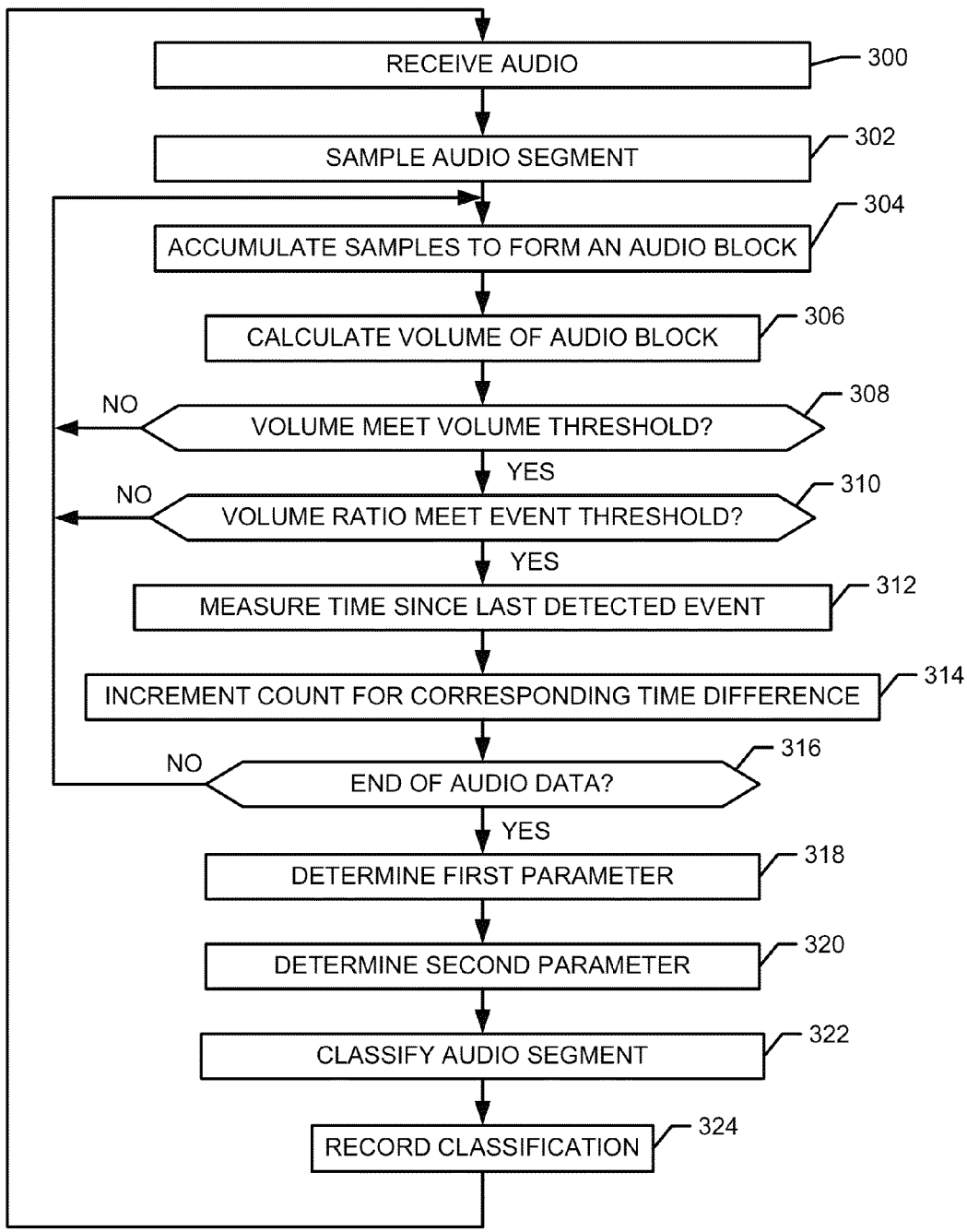
FIG. 3 is a flowchart representation of example machine readable instructions that may be executed to implement the example media detector of FIG. 2.

A flowchart representative of example machine readable instructions for implementing the media detector 200 of FIG. 2 is shown in FIG. 3. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example media detector 200 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program of FIG. 3 begins at block 300 at which the example media detector 200 receives audio. For example, the sensor 106 may collect an audio segment of twenty seconds from the environment 100. At block 302, the example sampler 202 samples the audio segment. At block 304, the example sampler 202 accumulates a number of samples to form an audio block. In some examples, the volume calculator 204 may accumulate the number of samples to form an audio block before processing the samples. At block 306, the example volume calculator 204 calculates a volume for the audio block. For example, the volume calculator 204 sums the absolute value of the audio signal spanning the audio block. Alternatively, other techniques for determining a volume, amplitude, and/or loudness for an audio block could be employed (e.g., root mean square amplitude calculation, power calculation, etc.). At block 308, the example volume calculator 204 determines whether the volume meets a volume threshold. For example, the volume threshold may be a minimum volume threshold such that a volume below the volume threshold may skew the calculations by indicating a false volume event occurrence between audio blocks. When the volume is below the volume threshold, control returns to block 304 to accumulate samples to form another audio block.

When the volume is not below the volume threshold, at block 310, the example volume comparator 206 determines whether a volume ratio of the volume value of the current audio block to volume value of the previous audio block meets a volume event threshold. For example, the volume comparator 206 determines whether the volume is greater than two times the volume of a previous audio block volume (e.g., a previous audio block that immediately precedes in time the audio block currently being processed). If the volume is not greater than the event threshold, control returns to block 304 to accumulate samples to form another audio block. Otherwise, control continues to block 312 at which the example event timer 208 measures the amount of time that has passed since the last detected volume event. At block 314, the example event tallier 210 increments a count corresponding to the value of the measured time difference (e.g., increments a counter, adds to a bin, etc.). At block 316, a determination is made whether the process is at the end of the audio segment (e.g., 20 seconds of audio have been processed). For example, the sampler 202 may indicate when the end of the audio segment is reached. When the example sampler 202 does not indicate the end of the audio segment, control returns to block 304 to continue accumulating samples to form the next audio block.

When the example sampler 202 indicates the end of the audio segment has been reached (block 316), control proceeds to block 318 at which the example adder 212 determines a first parameter. For example, the adder 212 receives the total number of detected volume events that were 20 milliseconds apart. At block 320, the example adder 212 determines a second parameter. For example, the adder 212 sums the total number of detected volume events that occurred that were less than 320 milliseconds apart. At block 322, the example classifier 216 classifies the audio segment using the first parameter and the second parameter. For example, the classifier 216 may query a parameter map lookup table 220 to determine whether the first parameter and the second parameter pairing corresponds to television program audio or to video game audio. Based on the classification, at block 324, the example classifier 216 records the classification in the example memory 218. The process then returns to block 300 at which the media detector 200 waits to receive audio.

Figure 4:
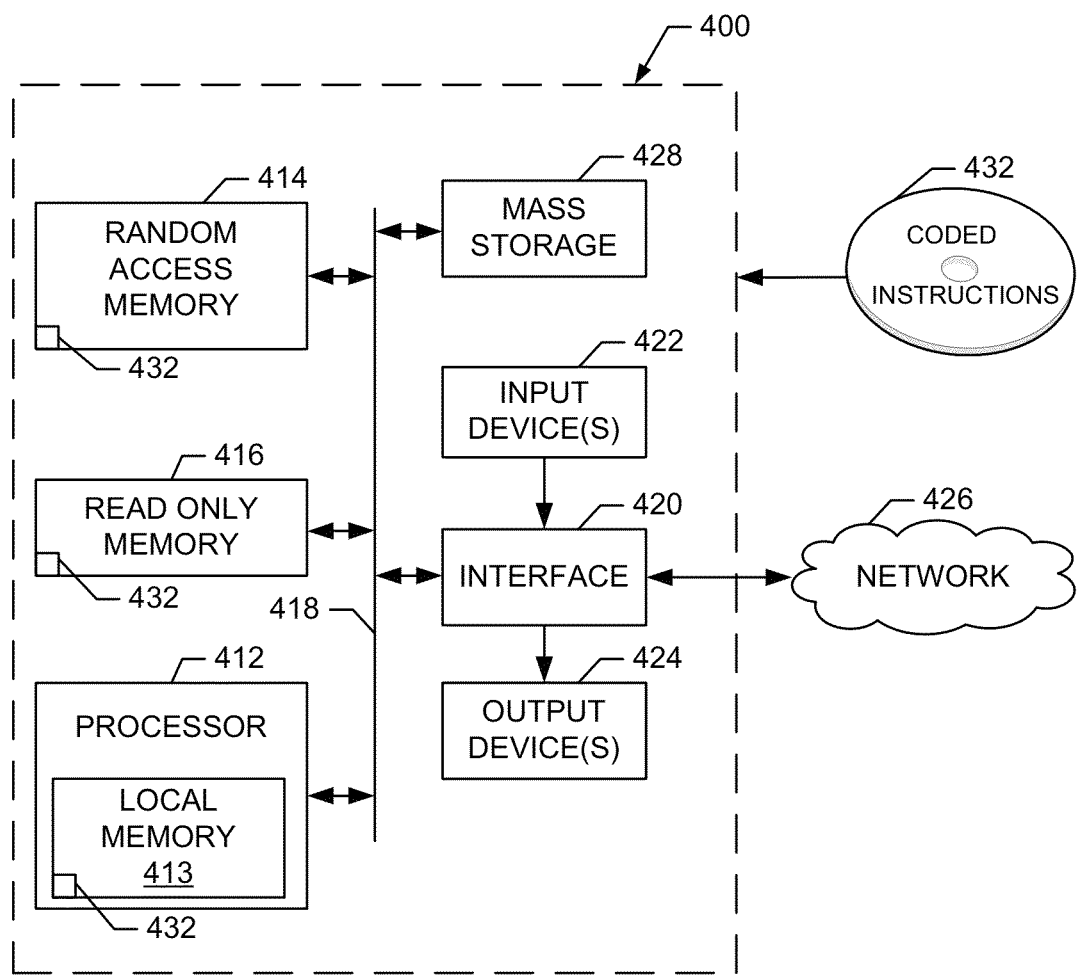
FIG. 4 is a block diagram of an example processor platform that may execute, for example, the machine-readable instructions of FIG. 3 to implement the example media detector of FIG. 2.

FIG. 4 is a block diagram of an example processor platform 400 capable of executing the instructions of FIG. 3 to implement the meter detector 200 of FIG. 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

Figure 5:
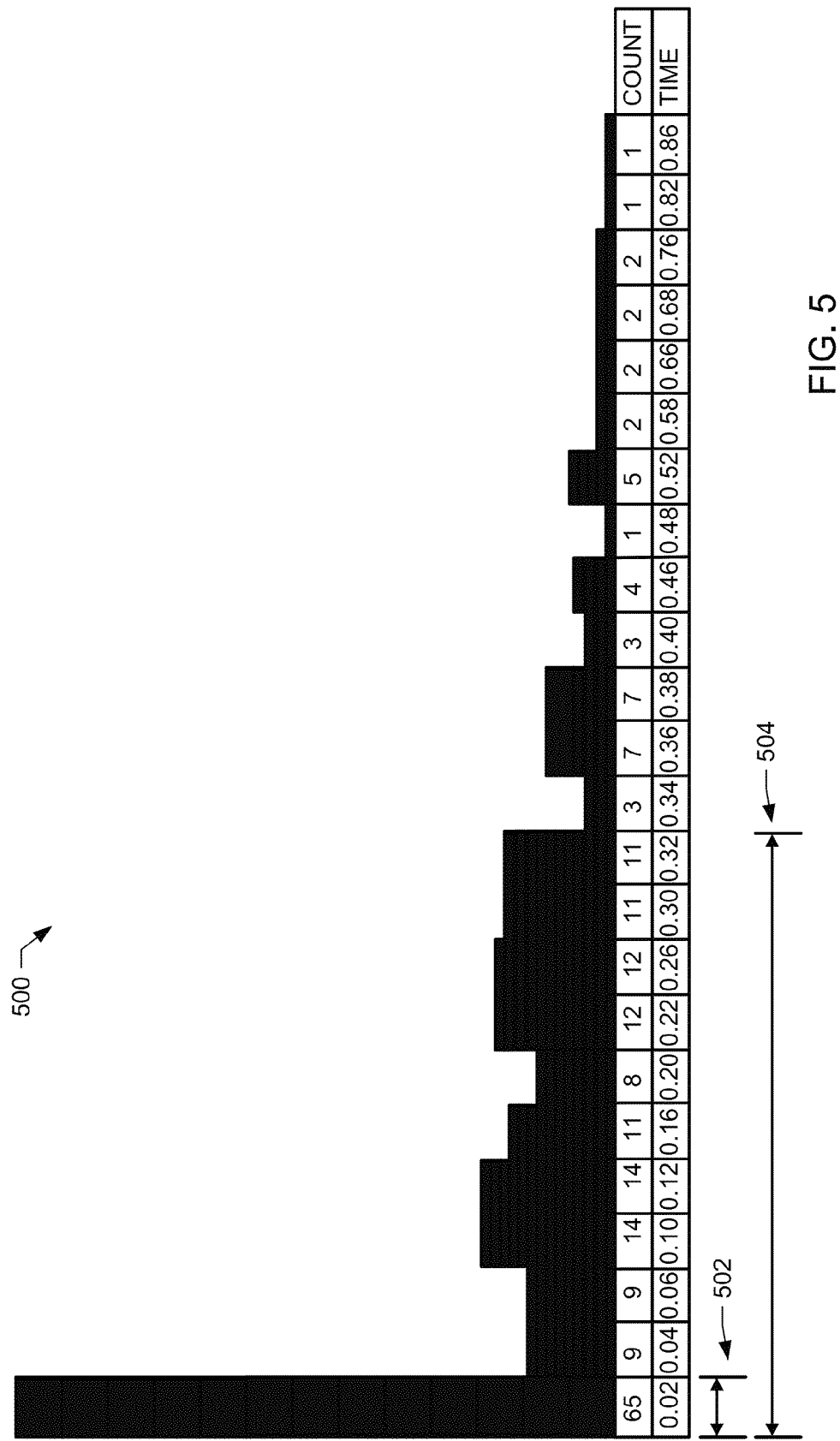
FIG. 5 is an example chart illustrating a distribution of volume events detected in example television program audio.

FIG. 5 is an example chart 500 illustrating a distribution of volume events detected in an example television program audio. The example chart 500 includes a period of time corresponding to a first parameter 502 (e.g., 20 milliseconds) and a period of time corresponding to a second parameter 504 (e.g., 320 milliseconds). In the illustrated example of FIG. 5, during the period of time corresponding to the first parameter 502, sixty-five (65) event occurrences (e.g., volume jumps, volume drops, etc.) were detected. In the illustrated example of FIG. 5, during the period of time corresponding to the second parameter 504, one hundred and seventy-six (176) event occurrences (e.g., volume jumps, volume drops, etc.) were detected.

Figure 6:
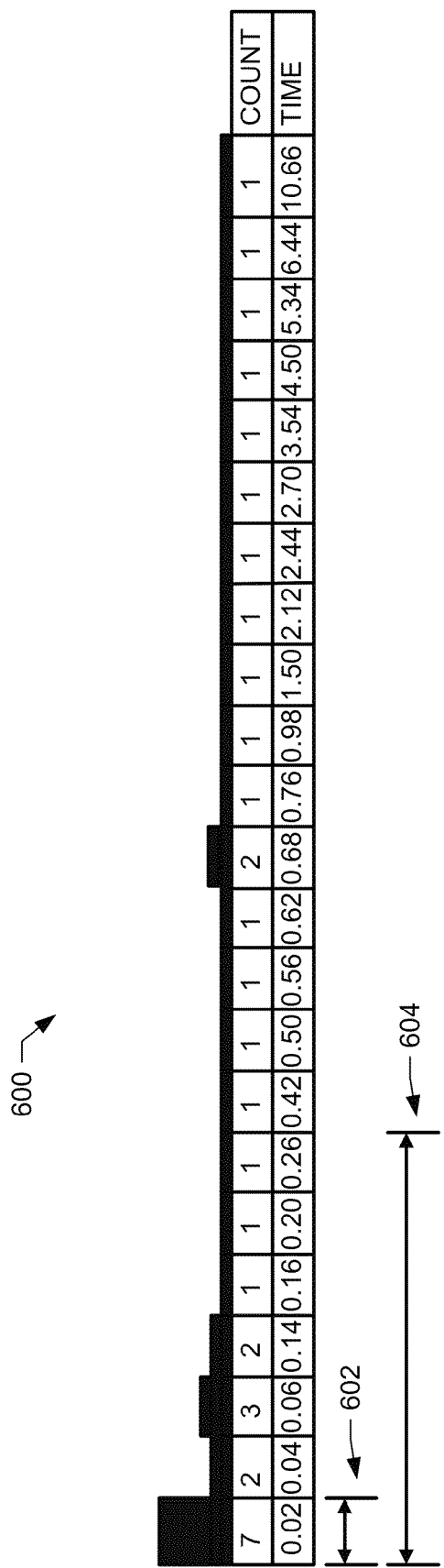
FIG. 6 is an example chart illustrating a distribution of volume events detected in example video game audio.

FIG. 6 is an example chart 600 illustrating a distribution of volume events detected in an example video game audio. The example chart 600 includes a period of time corresponding to a first parameter 602 (e.g., 20 milliseconds) and a period of time corresponding to a second parameter 604 (e.g., 260 milliseconds). In the illustrated example of FIG. 6, during the period of time corresponding to the first parameter 602, seven (7) event occurrences (e.g., volume jumps, volume drops, etc.) were detected. In the illustrated example of FIG. 6, during the period of time corresponding to the second parameter 604, seventeen (17) event occurrences (e.g., volume jumps, volume drops, etc.) were detected. In the illustrated example of FIG. 6, the second parameter 604 corresponds to 260 milliseconds rather than 320 milliseconds (as shown in FIG. 5) because no volume events were detected in the video game audio having time durations of greater than 260 milliseconds but less than 420 milliseconds.

Example methods, apparatus and articles of manufacture disclosed herein enable distinguishing between speech and non-speech (e.g., music, speech and music combined, etc.) and, thereby, classifying audio as, for example, a television program or a video game. In addition, example methods, apparatus and articles of manufacture enable discerning between television program audio and video game audio using timing characteristics of the audio.

While some example methods and apparatus disclosed herein classify audio as one of television program audio or video game audio, the disclosed methods and apparatus may be utilized to classify other types of audio. For example, the methods and apparatus may be utilized to classify audio as television programs or music, speech audio or non-speech audio, movies or television programs, movies or music, television programs or video games or music, and so forth. In some examples, the parameters described herein may be selected as parameters that distinguish among the desired classification categories. For example, the periods of time and number of such periods may be selected based on analysis of training data. In some examples, the parameters may be analyzed using ranges, bins, values, etc. that have been trained using training data for the classification categories. In other words, this disclosure is not limited to a number of classification categories or to any particular classification categories described as examples herein.

While some examples disclosed herein describe comparing a value to a threshold by determining if the value is greater than the threshold, any comparison may be utilized. For example, depending on the particular implementation, a value may be determined to be greater than or equal to a threshold, less than a threshold, less than or equal to a threshold, equal to a threshold, etc. Thus, this disclosure is not limited to determining if a value is greater than a threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to classify audio, the method comprising:
    associating, by executing an instruction with a processor, blocks of audio sensed from a media presentation device with volume events, a first audio block being associated with a first volume event when (1) the first audio block has a first volume value satisfying a volume threshold and (2) a ratio of the first volume value and a second volume value of a second audio block associated with a second volume event satisfies an event threshold;
    determining, by executing an instruction with the processor, a first count of volume events having respective elapsed times corresponding to a first range, a respective elapsed time of the first volume event corresponding to a first period of time between the first audio block and the second audio block;
    determining, by executing an instruction with the processor, a second count of volume events having respective elapsed times corresponding to a second range; and
    classifying, by executing an instruction with the processor, the audio sensed from the media presentation device based on the first count of volume and the second count of volume.

2. The method as defined in claim 1, further including:
    accumulating samples from the audio to form the first audio block; and
    summing absolute values of the samples of the first audio block to determine the first volume value.

3. The method as defined in claim 1, wherein the first volume value is determined subsequent to the second volume value.

4. The method as defined in claim 1, further including, when the first volume value satisfies the volume threshold, retrieving the second volume value from a buffer to determine whether the first audio block is associated with the first volume event.

5. The method as defined in claim 4, wherein the first volume value is stored in the buffer when the first volume value satisfies the volume threshold.

6. An apparatus to classify audio, the apparatus comprising:
    a volume comparator to associate blocks of audio sensed from a media presentation device with volume events, the volume comparator to associate a first audio block with a first volume event when (1) the first audio block has a first volume value that satisfies a volume threshold and (2) a ratio of the first volume value and a second volume value of a second audio block associated with a second volume event satisfies an event threshold;
    an adder to:
        determine a first count of volume events that have respective elapsed times that correspond to a first range, a respective elapsed time of the first volume event to correspond to a first period of time between the first audio block and the second audio block; and
        determine a second count of volume events that have respective elapsed times that correspond to a second range; and
    a classifier to classify the audio sensed from the media presentation device based on the first count of volume and the second count.

7. The apparatus as defined in claim 6, further including a volume calculator to:
    accumulate samples of the audio to form the first audio block; and
    sum absolute values of the samples of the first audio block to determine the first volume value.

8. A tangible computer readable storage medium comprising instructions that, when executed, cause a processor to at least:
    associate blocks of audio sensed from a media presentation device with volume events, the processor to associate a first audio block with a first volume event when (1) the first audio block has a first volume value that satisfies a volume threshold and (2) a ratio of the first volume value and a second volume value of a second audio block associated with a second volume event satisfies an event threshold;
    determine a first count of volume events that have respective elapsed times that correspond to a first range, a respective elapsed time of the first volume event to correspond to a first period of time between the first audio block and the second audio block;
    determine a second count of volume events that have respective elapsed times that correspond to a second range; and
    classify the audio sensed from the media presentation device based on the first count and the second count.

9. The tangible computer readable storage medium as defined in claim 8, wherein the instructions, when executed, further cause the processor to:
    accumulate samples from the audio to form the first audio block; and
    sum absolute values of the samples of the first audio block to determine the first volume value.

10. The method as defined in claim 1, further including comparing the first volume value to a lowest volume value to reduce false volume event detections.

11. The method as defined in claim 1, wherein the respective elapsed time of the first volume event corresponds to a number of audio blocks between the first audio block and the second audio block.

12. The method as defined in claim 1, wherein the classifying of the audio includes:
 identifying the audio as at least one of speech or not speech; and
 in response to identifying the audio as speech, determining the audio is collected from a television program presentation.

13. The method as defined in claim 12, further including determining the audio is collected from a video game presentation when the audio is identified as not speech.

14. The method as defined in claim 1, wherein the classifying of the audio includes mapping the first count of volume and the second count of volume to a classification in a multi-dimensional lookup table.

15. The method as defined in claim 1, wherein the classifying of the audio includes calculating a probability of the audio corresponding to a television program presentation.

16. The apparatus as defined in claim 6, wherein the classifier is further to:
 identify the audio as speech or not speech; and
 in response to identification of the audio as speech, determine the audio is collected from a television program presentation.

17. The apparatus as defined in claim 6, wherein the classifier is further to map the first count and the second count to a classification in a multi-dimensional lookup table.

18. The apparatus as defined in claim 6, wherein the classifier is further to calculate a probability of the audio corresponding to a television program presentation.

19. The tangible computer readable storage medium as defined in claim 8, wherein the instructions further cause the processor to:
 identify the audio as speech or not speech; and
 in response to identification of the audio as speech, determine the audio is collected from a television program presentation.

20. The tangible computer readable storage medium as defined in claim 8, wherein the instructions, when executed, further cause the processor to map the first count and the second count to a classification in a multi-dimensional lookup table.

21. The tangible computer readable storage medium as defined in claim 8, wherein the instructions further cause the processor to calculate a probability of the audio corresponding to a television program presentation.

\* \* \* \* \*